United States Patent [19]
Helle et al.

[11] 4,422,118
[45] Dec. 20, 1983

[54] INTEGRATED MAGNETIC TRANSDUCER

[75] Inventors: Michel Helle, Marcq; Jacques Desserre, Rambouillet, both of France

[73] Assignee: Compagnie Internationale pour l'Informatique, France

[21] Appl. No.: 273,617

[22] Filed: Jun. 15, 1981

[30] Foreign Application Priority Data

Aug. 27, 1980 [FR] France ................. 80 18599

[51] Int. Cl.³ .................... G11B 5/16; G11B 5/14; G11B 5/20
[52] U.S. Cl. .................... 360/126; 360/123; 360/127
[58] Field of Search ............... 360/123, 125, 126, 127, 360/121

[56] References Cited

U.S. PATENT DOCUMENTS

| | | | |
|---|---|---|---|
| 3,639,699 | 2/1972 | Tiemann | 179/100.20 |
| 3,961,299 | 6/1976 | Lazzari et al. | 356/218 |
| 4,052,749 | 10/1977 | Nomura | 360/127 |
| 4,092,688 | 5/1978 | Nomura | 360/126 |
| 4,353,102 | 10/1982 | Kanai | 360/126 |

FOREIGN PATENT DOCUMENTS 2150335 6/1973 France .

OTHER PUBLICATIONS

Abstract Japanese Publication 55-4737, Munehito Kumagai, Mar. 18, 1980.
Abstract Japanese Publication 55-12530, Yoshimasa Miura, Mar. 28, 1981.

*Primary Examiner*—Robert Martin Kilgore
*Attorney, Agent, or Firm*—Kerkam, Stowell, Kondracki & Clarke

[57] ABSTRACT

A magnetic transducer for reading magnetic information from a magnetic support such as a disc or tape which moves before it, comprises a magnetic circuit formed of two thin layer polar pieces having a gap at one end and means coupled magnetically to the circuit for transformation of magnetic flux loss of information into an electric signal. The pole pieces comprise at the level of the gap a central part bounded by two lateral parts spaced such that the magnetic coupling between the central parts is very much less than the magnetic coupling between the corresponding lateral parts of the pieces. The gap disposed between the central parts is larger than the gap of the lateral parts. There is a substantial reduction in Barkhausen noise and parasitic edge effects over conventional transducer constructions which is obtained by making the thickness of the pole pieces of the transducer substantially greater in the area of the geometric path Lpm than at the lateral portions beyond Lpm.

9 Claims, 12 Drawing Figures

INTEGRATED MAGNETIC TRANSDUCER

BACKGROUND OF THE INVENTION

1. Field of the Invention

The present invention relates to integrated magnetic transducers and it is particularly applicable to the reading of information contained on magnetic data supports such as magnetic discs, rigid or flexible tapes and the like.

2. Description of the Prior Art

It is known that magnetic discs may have information recorded thereon on registering paths which are concentric and circular and which have a radial length not exceeding several hundredths of millimeters and generally covering the major part of their two faces. Magnetic tapes on the other hand carry information on longitudinal paths parallel to the length of the tape.

Integrated magnetic transducers are being utilized more and more frequently either for registering information on registry supports such as discs or magnetic tapes or to read information previously recorded thereon. Generally, one or several transducers are associated with the registry support which is transported before the one or the several transducers. For simplification, it will be supposed in the following description that a single transducer is associated with a single registry support.

For a better understanding of the objects and advantages of the present invention, a brief mention will be made of the several theories of magnetism.

To magnetize a magnetic material within its interior when the magnetic induction is weak, the material should first be subjected to a magnetic field having a sufficient intensity so that the material is saturated, that is to say, that the magnetic induction in the material reaches a limit value $B_s$. The exterior magnetic field is then removed. There then remains in the material a magnetic induction of some value called remanant induction, $B_r$, characteristic of the material. The initial magnetic permeability of the material is defined by the ratio (B/H) between the induction and the magnetic field when B and H are close to zero and this at the starting point of the hysteris curve of magnetization. In other words, the initial magnetic permeability of the material is equal to the slope of the magnetic curve in the neighborhood of point $B=0$ and $H=0$.

It will be recalled that an anisotropic magnetic material has in general two privileged directions of magnetization which are most often perpendicular one to the other. One of these is called direction of easy magnetization and the other is called direction of difficult magnetization. The initial permeability of the material in the direction of difficult magnetization is much greater than the initial permeability of the material in the direction of easy magnetization. Integrated magnetic transducers of the type to which the present invention relates are described, for example, in U.S. Pat. No. 3,723,665 and U.S. Pat. No. 3,846,842.

Such a transducer comprises a magnetic circuit formed of two polar pieces in thin layers, connected at one end in such a way that they are magnetically coupled and disposed with its other end adjacent the registry support associated with the transducer in such a way as to form an air gap. One of the two polar pieces is disposed on a substrate. Each polar piece has a substantially rectangular form with its largest, or longitudinal dimension being perpendicular to the registry support. The air gap has a substantially rectangular shape and its large dimension Lpm is on the order of the radial size of the paths of the support, and its plane is substantially perpendicular to the polar pieces and disposed at a very small distance from the surface of the registry support, a distance being between zero and several tenths of microns. An electric coil formed of thin conductive superimposed layers. These layers are separated from each other by thin electrically insulating layers. Reference to thin layers means layers having a thickness on the order of several Angstroms to several microns. A part of the coil passes between the two polar pieces in such a way that these polar pieces form an envelope for this part of the coil.

The magnetic registry support associated with the transducer is transported in front of the transducer and perpendicular to the plane of the polar pieces and perpendicular to the greatest dimension of the gap. It is known that the magnetic information on a path of a registry support produces a magnetic flux loss at the immediate neighborhood of the surface of the support. This flux which passes through the air gap of the integrated magnetic transducer with which it is associated traverses the coil of the transducer producing a useful read signal S that is received at the poles of the coil. This signal is sent to electronic circuits for reading associated with the transducer.

In current practice, the magnetic material making up the polar pieces is preferably anisotropic and its direction of easy magnetization is parallel to the registry support and equally parallel to the large dimension of the air gap. The axis of difficult magnetization has the same direction as the large dimension of the polar pieces, i.e., perpendicular to the registry support.

Preferably, the integrated magnetic transducers of which the polar pieces are constituted of an anisotropic magnetic material are made in the manner described in U.S. Pat. No. 4,016,601. An integrated magnetic transducer such as that described in U.S. Pat. No. 4,016,601 comprises polar pieces which have a narrowing at the level of the air gap. The length of the narrowing measured in the plane of the gap is equal to the large dimension of this last or Lpm, and is also designated under the name of "width of the geometric path". To obtain this narrowing, the polar pieces are machined by ionic attack on a depth of attack normal to the plane of the gap and equal to the length Prof (Prof, which is on the order of several microns, is measured in the direction of the large dimension of the polar pieces). Such integrated magnetic transducers have a relatively high reading efficiency which is a measure of the ratio between the voltages available at the poles of the winding and the magnetic flux which enters in the transducer at the level of the air gap.

Finally, to better understand the objects and advantages of the present invention, it is useful to consider the following: A polar piece is constituted by a single or by several layers of magnetic material. In one, as in the other of the two cases, the polar piece is defined as "single layer polar piece" if the direction of magnetization can change, in discontinuous manner, only through a magnetic wall and not through a layer deposited or formed by oxidation or other processes. The magnetic wall is called the geometric location of the points of the single layer polar piece where the change of direction occurs, the phenomena being considered on the macroscopic scale. It is thus seen that one considers the definition of the "single layer polar piece" under its magnetic aspect and not its geometric and/or crystalline aspect.

In view of the dimensions of each polar piece, it may be observed that there is created by reason of all of the responsible factors of its anisotropie, a plurality of small magnetic areas among which some exist where the magnetization is anti-parallel which means that for two adjacent magnetic areas the magnetization is in opposite sense. A direction of magnetization in each of the magnetic areas is parallel to the direction of easy magnetization, that is to say parallel to the registry support and perpendicular to the direction of movement of it. This phenomena of appearance of magnetic areas in the anisotropic single layer polar pieces of small dimension is established by M. Jean-Pierre LAZZARI in his doctorate thesis at Grenoble on Dec. 18, 1970 having the title: "Studies and Structures of a New Registry Head: Integrated Magnetic Head in Thin Layers" and also described in the following publication: Hempstead R. D., Thompson D. A., Transaction on Magnetics, Vol. MAG 14, No. 5 Sept. 78, of which the title is: Unidirectional Anisotropy In Nickel-Iron Films by Exchange Coupling With Antiferromagnetic Films". The geometric location of the points separating two magnetic areas which are adjacent or where the magnetization changes in sense and direction is called by analogy the magnetic wall with the definition given above of the monolayer polar piece. It is also shown that outside of the adjacent magnetic areas with anti-parallel magnetization, there also exist so called closed areas situated on the edges of each polar piece. There occurs in effect between two adjacent magnetic areas with anti-parallel magnetization on the edges of the polar pieces small closed magnetic areas where the magnetization has a different orientation from that of the magnetization in these two magnetic areas with anti-parallel magnetization.

When the integrated magnetic transducer reads this informations, the existence of the magnetic areas with anti-parallel magnetization and of the closed magnetic areas causes the existence of a Barkhausen noise signal which is superposed on the useful output signal S of the transducer. This is due to the following phenomenon: Under the effect of the magnetic field of loss of information of the support, the magnetic walls separating two areas displace. There occurs the creation of an electromotive induction force of noise, called "parasitic induction force" due to the modification of the distribution of the magnetization in the pole pieces caused by the displacement of the magnetic walls. It is shown that this Barkhausen noise signal takes on greater importance as the ratio Prof/Lpm becomes greater and that is to say when Lpm is small or small with respect to Prof. It can be shown that in this case, the number of magnetic areas is large. The Barkhausen noise signal is a function of the number of areas.

Thus, the Barkhausen noise signal is large when, for example, the information is to be read from a magnetic disc of which the radial density of registration is high. Radial density is defined as the number of registry paths per millimeter measured along a diameter of the disc. Because the radial width has a small value, the value Lpm is equally very small consequently the ratio Prof/Lpm is large.

It should thus be apparent that for an integrated magnetic transducer having the value of Lpm small with respect to Prof (and in front of the large dimension of the polar pieces), there is: On the one hand an increase in the noise signal due primarily to the increase of the Barkhausen noise signal, which signal is called B; and on the other hand a decrease of the useful signal S since in the first approximation this is proportional to Lpm. Consequently the ratio signal/noise S/B decreases.

SUMMARY OF THE INVENTION

The present invention corrects this inconvenience and improves the signal/noise ratio S/B notably by the suppression of the magnetic areas or by decreasing their number which results in the reduction of the Barkhausen noise. This is obtained by making the thickness of the pole pieces of the transducer substantially greater in the area of the geometricpath Lpm than at the lateral portions beyond Lpm. Either of the polar pieces comprises a central part Lpm. The center part is surrounded by two lateral parts. The air gap is disposed between the two central parts. The two polar pieces are such that the magnetic coupling (coefficient of mutual induction) between their central parts at the level of the air gap, is less than the magnetic coupling of the lateral parts of each polar piece with the lateral parts corresponding from the other piece. The variation in coupling is achieved by use of a non-magnetic material between the pole pieces having a thickness greater in the central region than in the lateral region. The large magnetic coupling between the lateral parts of the pole pieces allows substantial reduction and even suppression of the areas not only in the lateral parts, but also in the central parts.

In accordance with the present invention, the integrated magnetic transducer for reading magnetic information positioned relative to a magnetic support which moves before it and which contains information within a plurality of paths, comprises: a magnetic circuit formed of two thin layer polar pieces separated by an air gap parallel to the support. The large (length) dimension of the pieces is perpendicular to the direction of motion of the information. Suitable means coupled magnetically to this circuit, are provided for transformation of the magnetic flux loss of information into an electric signal. The invention is particularly characterized in that the polar pieces each comprise, at the level of the air gap, a central part surrounded by two lateral parts constructed such that the magnetic coupling of the central parts between which is disposed the air gap is very inferior to the magnetic coupling between the lateral parts corresponding of the pole pieces.

BRIEF DESCRIPTION OF THE DRAWINGS

Other characteristics and advantages of the present invention will appear in the following description given by way of example and not by way of limitation and referring to the accompanying drawings, wherein:

FIG. 2 comprising two parts 2a and 2b shows a preferred embodiment of an integrated magnetic transducer in accordance with the prior art such as described in U.S. Pat. No. 4,016,601, the polar pieces of this transducer comprising a narrowing RET at the level of the air gap.

FIG. 3 comprises three parts, 3a, 3b and 3c and shows how the magnetic areas are constituted in a "single layer polar piece" made of an anisotropic magnetic material.

FIG. 4 comprising parts 4a and 4b shows a preferred embodiment of an integrated magnetic transducer in accordance with the invention.

DESCRIPTION OF PREFERRED EMBODIMENTS

Figure 1:
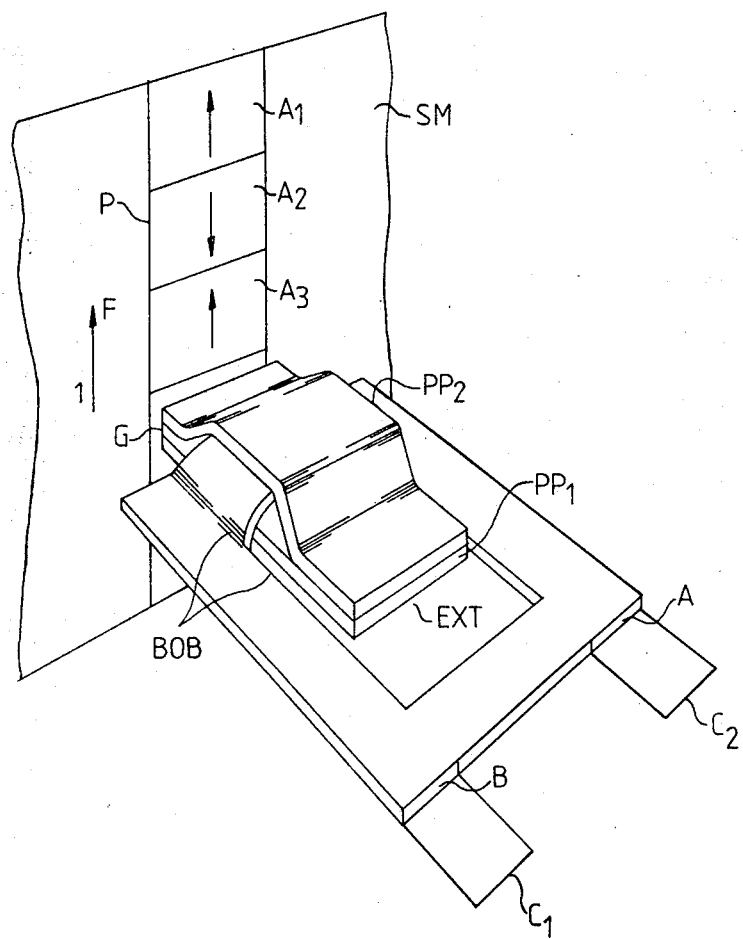
FIG. 1 is a three-quarter perspective view showing the structure of a reading integrated magnetic transducer for information contained on a magnetic support in accordance with the prior art as described in U.S. Pat. No. 3,723,665.
Figure 2A:
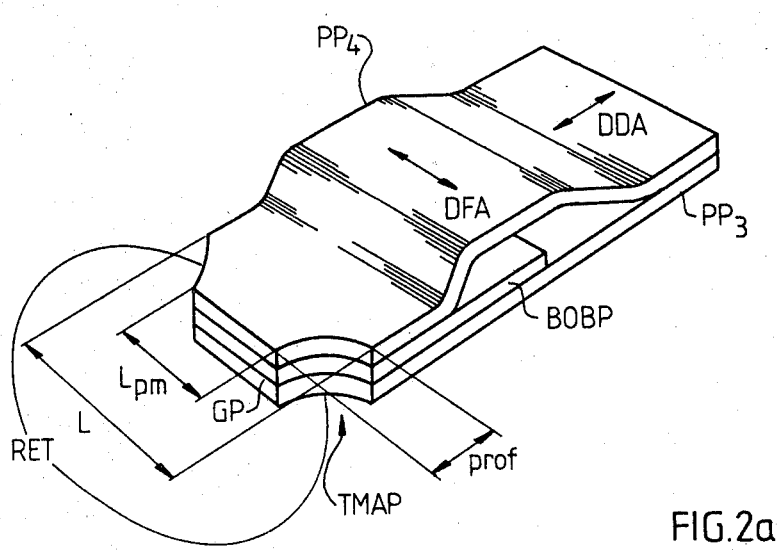
FIG. 2a shows a three-quarter perspective view of the assembly of the transducer.
Figure 2B:
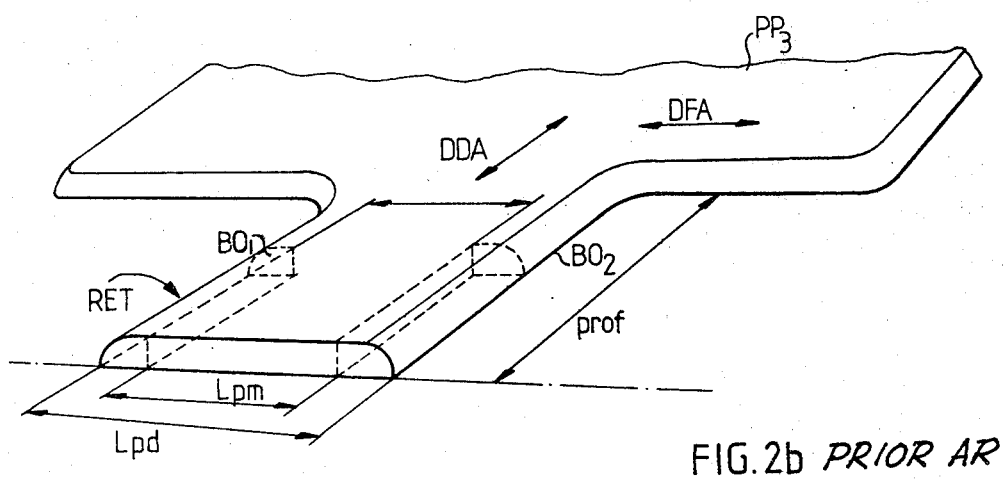
FIG. 2b is a three-quarter perspective view of the part of a polar piece situated at the level of the air gap.

For a better appreciation of how the integrated magnetic transducer of the present invention is constituted, reference will be made on the one hand to the integrated magnetic transducer in accordance with the prior art, as illustrated by FIGS. 1, 2a, 2b; and on the other hand on the manner in which magnetic areas are constituted in the anisotropic magnetic polar pieces illustrated by FIGS. 3a, 3b, 3c.

Such integrated magnetic transducers have already been described in the aforenoted U.S. Pat. Nos. 3,723,665, 3,846,842 and 4,016,601 to which reference should be made. Said patents are assigned to the assignee of the present invention and which provide an excellent background for a clear understanding of the inventive concepts described herein.

Referring to FIG. 1a, an integrated magnetic transducer TMA in accordance with the prior art comprises a magnetic circuit formed of two magnetic polar pieces made up of thin layers $PP_1$ and $PP_2$ entirely superposed and magnetically coupled to a winding BOB. These polar pieces are magnetostatically coupled between them and at a first extremity EXT and form the air gap G at the other extremity. Polar piece $PP_1$ is disposed on a substrate which may be, for example, of insulating material not shown in FIG. 1 to simplify the drawing.

In FIG. 1, the transducer TMA is shown in disposed with regard to a registering support SM of which only a part has been shown for simplification. This support comprises a plurality of registry paths of which only path P is shown. Path P may have recorded thereon a plurality of elementary magnetic informations of which only three are shown, that is, informations $A_1$, $A_2$ and $A_3$ on FIG. 1. The support SM, as shown extending in the direction of the arrow F, may be for example a magnetic disc pertaining to a disc memory which for simplicity is indicated to have rectilinear motion, although it will be obvious to those skilled in the art that disc SM is rotated about a central axis, the arrow F representing movement at a joint. The winding BOB is formed of a succession of thin conducting layers and insulation layers stacked in accordance with a direction perpendicular to the plane of the magnetic polar pieces $PP_1$ and $PP_2$. A part of the thin conducting layers and insulation are flush in the gap G. This succession of thin layers and insulation layers is not shown in detail in FIG. 1 for simplicity, such structure generally being well known.

The winding BOB comprises, for example, two output conductors (and eventually a third), that is the conductors $C_1$ and $C_2$ which are connected on the one hand to the extremities A and B of the winding and on the other to the electronic reading circuit of the memory disc containing the disc SM the third output conductor (not shown) is connected to the middle point of the winding. The integrated magnetic transducers are preferably realized in the manner shown in FIGS. 2a and 2b and as shown for example, in U.S. Pat. No. 4,016,601.

Thus, as can be seen in FIGS. 2a and 2b, transducer TMAP has polar pieces $PP_3$ and $PP_4$ constructed with a narrowing RET. The polar pieces $PP_3$ and $PP_4$ are made of anisotropic magnetic material of which the axis of difficult magnetization is oriented in accordance with the direction DDA perpendicular to the magnetic support SM. This direction remains tangent to the surface of the polar pieces. The axis of easy magnetization of these polar pieces is oriented in accordance with the direction DFA perpendicular to the direction of difficult magnetization DDA and parallel to the registering support SM.

The transducer TMAP comprises at the level of its gap GP, a narrowing RET of depth of attack Prof, which is generally on the order of several microns. This narrowing is such that the large dimension of the air gap GP, that is Lpm, is substantially less than the full width L of the pole pieces extending beyond the limits of this narrowing, that is to say the maximum width of Lpm. In current use, the ratio L/Lpm is less or equal to 2.

As shown in U.S. Pat. No. 4,016,601, such a transducer TMAP allows registry on the support SM of registry paths having a radial width defined with great precision and approximately equal to the width Lpm.

FIG. 2b shows in greater detail the form of the two polar pieces before and after machining. The polar piece $PP_3$ is shown for example at the level of the narrowing RET. Before machining the piece $PP_3$ as, at the level of narrowing, $PP_3$ has a width Lpd called the displaced width. One then machines the edges $BO_1$ and $BO_2$ of the narrowing RET in such a way as to slightly reduce them. There is thus obtained a pole piece of which the width is Lpm, with Lpm being slightly less than Lpd.

Figure 3A:
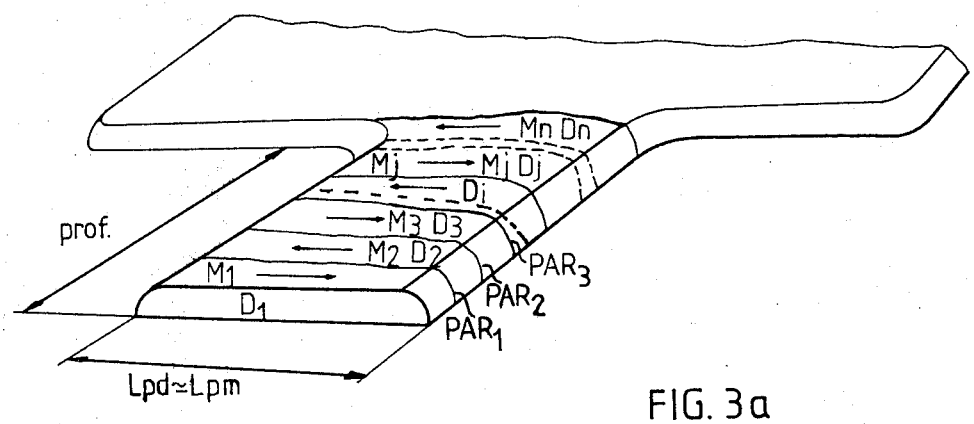
FIG. 3a shows how the adjacent magnetic areas are constituted.

As shown in FIG. 3, for pole pieces such as $PP_3$ or $PP_4$ made of anisotropic magnetic material of thickness e less than or equal to 10 microns, one can observe at the level of narrowing RET a series of magnetic areas $D_1$, $D_2$, $D_3$ ... $D_i$, $D_j$ ... $D_n$ in which the magnetization is anti-parallel, that is to say that the magnetization $M_1$ in the area $D_1$ is parallel and of opposite sense to the magnetization $M_2$ in area $D_2$, that the magnetization in area $D_2$ is parallel and of opposite sense to the magnetization in area $D_3$ and so on in order. One sees thus that the magnetization in the areas of odd order $D_1$, $D_3$, $D_5$, $D_7$ etc. is parallel and of the same sense. The same applies for the magnetization in the areas of even order $D_2$, $D_4$, $D_6$, etc. i.e., it is parallel and of the same sense, this sense being opposite to that of the magnetization in the odd order. The magnetic area $D_1$ is separated from the magnetic area $D_2$ by a magnetic wall $PAR_1$. The area $D_2$ is separated from the area $D_3$ by a magnetic wall $PAR_2$, and the magnetic area $D_i$ is separated from the magnetic area $D_j$ by the magnetic wall $PAR_j$, and so on, as illustrated in FIG. 3a.

Figure 3C:
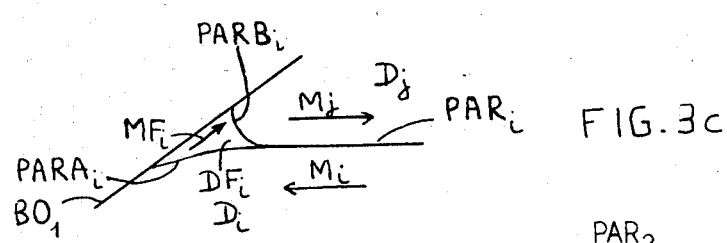
FIG. 3c shows how the closed magnetic areas are constituted.
Figure 3B:
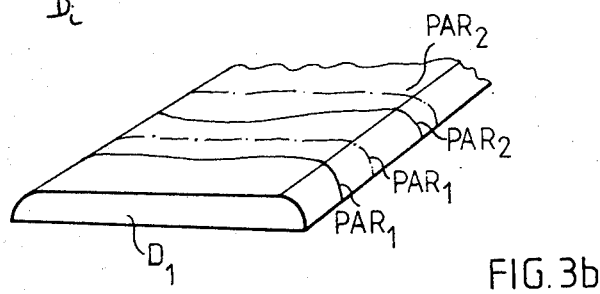
FIG. 3b shows how the magnetic walls are displaced which walls are disposed between the areas.

With reference to FIG. 3c which shows a part of the magnetic areas $D_i$ and $D_j$, it can be observed on the edge $BO_1$ of the narrowing RET, between the areas $D_i$ and $D_j$, a closed magnetic area $DF_i$, where the magnetic induction $MF_i$ has a different orientation from the magnetic inductions $M_i$ and $M_j$ in the areas $D_i$ and $D_j$. The induction $MF_i$ can be for example substantially perendicular to the inductions $M_i$ and $M_j$, as is represented in FIG. 3c. It should be apparent that the magnetic wall $PAR_i$ which separates the areas $D_i$ and $D_j$ is divided in two walls $PARA_i$ and $PARB_i$ on the edge $BO_i$ of narrowing RET. It is clear that on the edge $BO_2$ (not represented in FIG. 3c) at the narrowing RET one would observe a closed area $DF'_i$ where the induction $MF'_i$ is parallel and of opposite sense to the induction $MF_i$ in area $DF_i$.

During the reading operations of transducer TMAP, the field of loss $H_f$ produced by the magnetic informations $A_1$, $A_2$, $A_3$, etc. of the magnetic path P of the support SM traverse the different magnetic areas $D_1$, $D_2$, $D_i$, etc. By reason of the anisotrophy of the polar pieces $PP_3$ and $PP_4$, the magnetic permeability in the sense of the direction of difficult magnetization being very much greater than the magnetic permeability in the direction of easy magnetization, the lines of flux of the magnetic field of loss are quasiperpendicular to the walls of the areas. The following phenomena are thus produced as shown in FIG. 3b:

At the level of the magnetic areas $D_1$, $D_2$, ... $D_i$, $D_j$, $D_n$ their walls move in discontinuous fashion under the action of the magnetic field of loss $H_f$. There then results the production of an electromotive force of parasitic induction which contributes to the noise signal B. At the level of the closed magnetic areas $DF_i$, $DF'_i$, $DF_j$, $DF'_j$ etc.: there is displacement in discontinuous manner in a direction parallel to the magnetic field of loss $H_f$, which equally produces an electromotive induction parasitic force which adds to the induction force of noise due to areas $D_i$, $D_j$ etc. The sum of the parasitic inductive electromotive forces due to the magnetic areas $D_i$, $D_j$, and to the closed magnetic areas $DF_i$, $DF'_i$, $DF_j$, $DF'_j$, etc. constitute the Barkhausen noise signal. The smaller the dimension Lpd and the larger the ratio Prof/Lpd (or Prof/Lpm) Barkhausen noise signals take on greater importance because of the probability of existence of the magnetic areas $D_i$, $D_j$ etc. and of closed magnetic areas $DF_i$, $DF'_i$, etc. is increased.

Figure 4B:
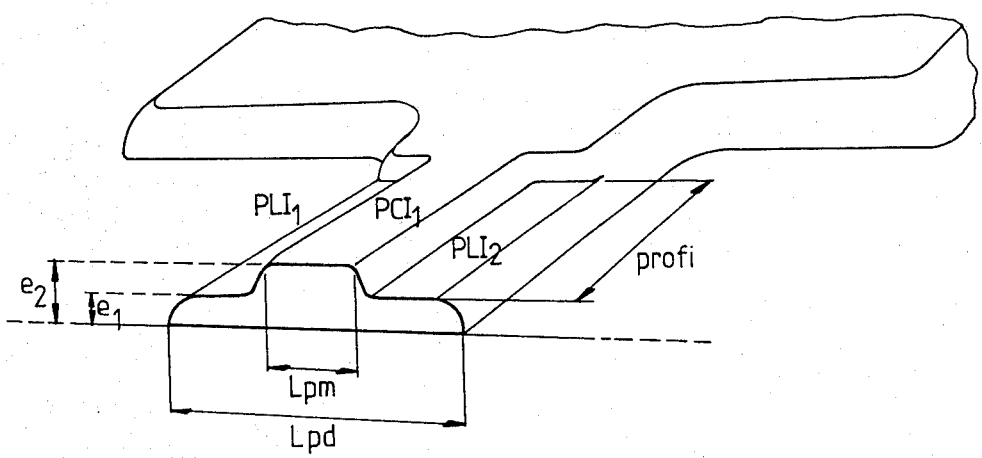
FIG. 4b is a three-quarter perspective view showing a single polar piece seen also at the level of the air gap.
Figure 4A:
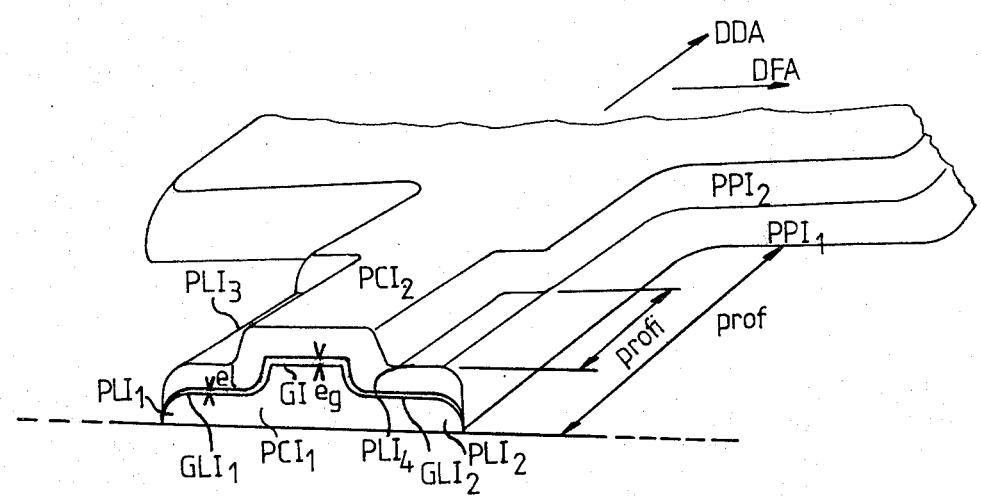
FIG. 4a is a three-quarter perspective view showing a part of the polar pieces seen at the level of the air gap.
Figure 5:
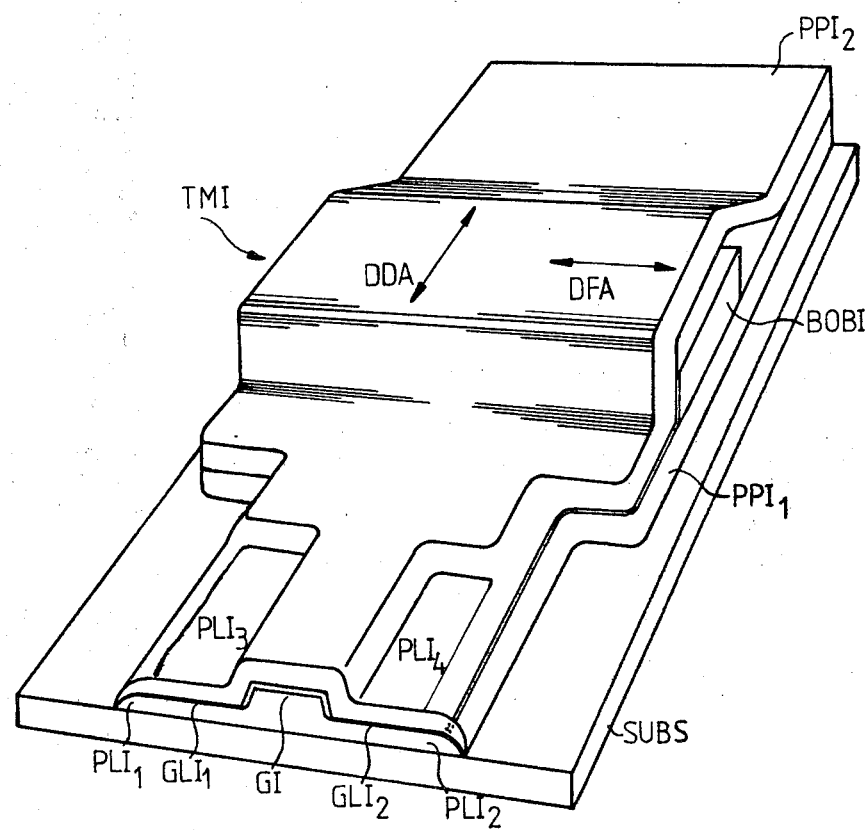
FIG. 5 is a three-quarter perspective view showing a magnetic integrated transducer in accordance with the present invention disposed on its substrate.

The integrated magnetic transducer TMI in accordance with the invention shown in FIG. 4a, 4b and 5 minimizes these deficiencies and decreases the number of adjacent magnetic areas with antiparallel magnetic action and the number of closed areas and, accordingly, reduces the Barkhausen noise signal, even to the extent of suppressing it.

Referring to FIGS. 4a, 4b and 5, the integrated magnetic transducer TMI in accordance with the present invention comprises a winding BOBI, a first magnetic pole piece $PPI_1$ and a second magnetic pole piece $PPI_2$ of a total width Lpd. The pole piece $PPI_1$ is disposed on the substrate SUBS. Each of these pole pieces comprises, at the level of the gap, that is to say at its part closest to the support SM, a central part and two lateral parts. Pole piece $PPI_1$ comprises a central part $PCI_1$ of thickness $e_2$ as shown in FIG. 4b. The width Lpm, adjacent to the radial width of the paths of the registering magnetic support SM, and the two lateral parts $PLI_1$ and $PLI_2$ of thickness $e_1$ less than $e_2$, is of depth Profi, which is less than the total depth Prof as shown in FIGS. 4a, 4b and 5.

The pole piece $PPI_2$ comprises a central part $PCI_2$ of thickness $e_2$, of width Lpm and of depth Profi, and two lateral parts $PLI_3$ and $PLI_4$ of thickness $e_1$, less than $e_2$, and of depth Profi.

The two central parts $PCI_1$ and $PCI_2$ are separated by a non-magnetic material of thickness $e_g$ in such a way as to form the gap GI of the transducer, while the lateral parts $PLI_1$ - $PLI_3$ on the one part, $PLI_2$ - $PLI_4$ on the other hand, are separated by a non-magnetic material of thickness $e_1$ very much less than $e_g$. Preferably, the non-magnetic material which separates the lateral parts and the central parts is the same conformed in a single layer of which the thickness varies according to whether one is at the level of the central parts or at the level of the lateral parts. It can be equally said that the lateral parts $PLI_1$ - $PLI_3$, $PLI_2$ - $PLI_4$ are respectively separated by the lateral gaps $GLI_1$ and $GLI_2$ and the thickness of the gaps is greatest at the central portion LPM than at the lateral portions. Generally the total width Lpd for the polar pieces is very much greater than Lpm.

In view of the above described construction, the magnetic coupling of the central parts $PCI_1$ and $PCI_2$ of the polar pieces $PPI_1$ and $PPI_2$ is substantially less than the magnetic coupling of the lateral parts $PLI_1$ - $PLI_3$, and $PLI_2$ - $PLI_4$, due to the fact that the thickness of the non-magnetic material between the central parts is very much greater than the thickness of the magnetic material between the lateral parts. In the end, i.e. at the extremities, the thickness $e_1$ of the material between the lateral parts, which is obviously the same for the lateral parts $PLI_1$ and $PLI_3$ on the one hand and $PLI_2$ and $PLI_4$ on the other, can taper to be extremely small. In this case, the magnetic coupling between the extremity of the lateral parts is obviously the maximum.

The upper part of the polar pieces which is not situated at the level of the gap neither comprises the central part nor the lateral part, but has a constant thickness equal to the thickness $e_2$, which is the thickness of the central parts $PCI_1$ and $PCI_2$ of the pieces at the level of the gap.

The disposition of the pole pieces $PPI_1$ and $PPI_2$ of the transducer TMI in accordance with the invention described, substantially decreases the number of magnetic areas at the level of the central part $PCI_1$ and $PCI_2$ for the following reasons: Concerning the number of magnetic areas, each of the polar pieces at the level of the gap, on a thickness Profi, act as if they had a width Lpd. But it has been seen that the more the ratio Prof/Lpd is decreased, the more the probability that the number of areas will be reduced is increased which is here the case. The large magnetic coupling between the lateral parts of the pole pieces equally permits the decrease of the number of areas and to reduce the fields of demagnetization within each pole piece. In other words, the effect of the diminution of the demagnetizing fields, and thus of the number of magnetic areas in the pole pieces which occurs at the level of their lateral parts has practically the same effects at the level of their central parts.

Figure 7A:
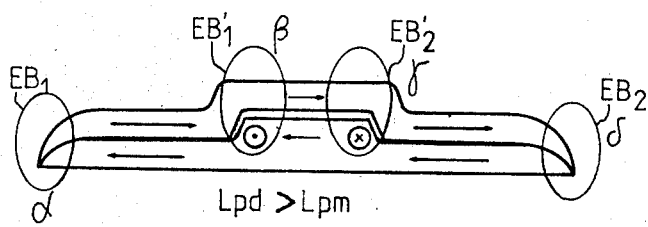
FIG. 7 comprises FIGS. 7a and 7b which are views from below of polar pieces showing respectively where the geometric effects are localized due to the form of the edges (again called edge effects) when a part of the dimension Lpd is greater than the dimension Lpm and when on the other part Lpd is much greater than Lpm.
Figure 7B:
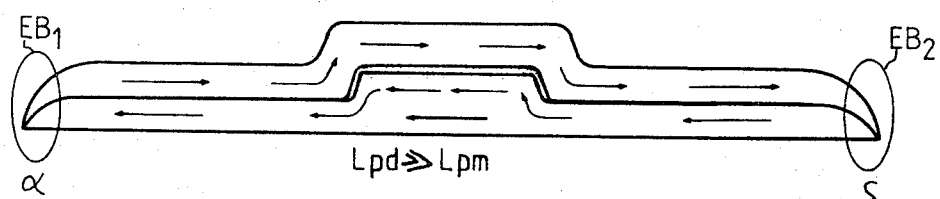

Referring to FIGS. 7a and 7b, it will be seen that the dispostion adopted for the pole pieces of the integrated magnetic transducer TMI in accordance with the invention decreases the parasitic magnetic effects which occur on the edges of the polar pieces and which disturb the reading of information contained on the support SM. These parasitic magnetic effects are usually known under the name of "edge effects". This diminution of the edge effects is greater when Lpm is much less than Lpd which is the case in FIG. 7b. It is seen from FIG. 7b that the edge effects exist only at the level of the extremities of the lateral parts of the pole pieces either α and δ, these effects being defined $EB_1$ and $EB_2$ and being symbolized by elipses. As seen to the contrary in FIG. 7a, that if Lpm is less than Lpd in less proportion than in FIG. 7b, edge effects $EB'_1$ (β) and $EB'_2$ (γ) subsist on the edges of the central part of the polar pieces.

Figure 6:
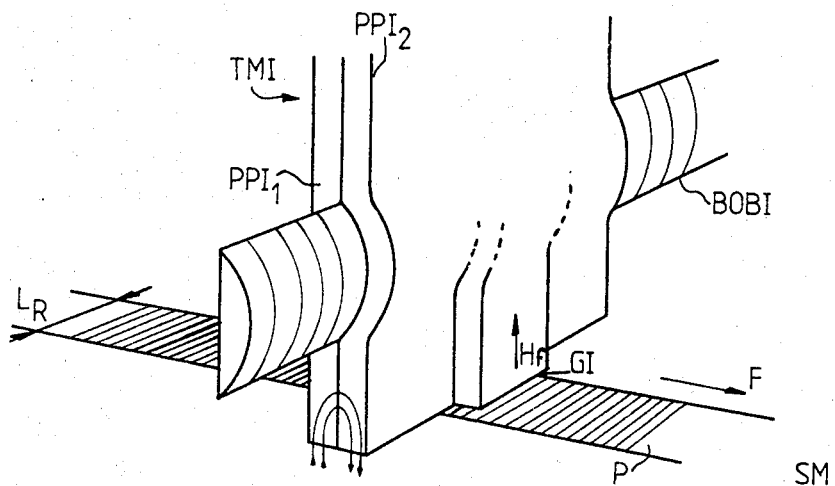
FIG. 6 is a schematic view showing how an integrated magnetic transducer in accordance with the invention is disposed with respect to the registry path of an information support.

The arrangement adopted for the pole pieces of the transducer TMI in accordance with the invention has equally another advantage illustrated by FIG. 6. This figure shows very schematically the relative disposition of the integrated magnetic transducer TMI with respect to a path P of support SM. The central part of the polar pieces and consequently the gap is perfectly centered on the path P, that is to say that the axis of symmetry of the gap GI, which is parallel to the direction of movement of the path P symbolized by the arrow F, is perpendicular to the pole pieces and is coincident with the axis of symmetry of path P. It will be recalled that the large dimension of gap GI, that is Lpm, is substantially equal to the radial width $L_R$ of path P.

Because of the extremely strong magnetic coupling between the lateral parts of the pole pieces $PPI_1$ and $PPI_2$, the magnetic fields of loss of information of the paths adjacent the path P which are short-circuited by this, as can be seen in FIG. 6, will not penetrate into winding BOBI of transducer TMI and accordingly will not cause any parasitic signal. On the contrary the central part $PCI_1$ and the central part $PCI_2$ perfectly channelize the magnetic field of loss $H_f$ of magnetic information of path P in such a way that these are captured by the winding BOBI.

It should be apparent that the structure proposed for the magnetic transducer TMI in accordance with the invention is equally applicable to a transducer in which the pole pieces are not single layers by are multilayer. It should also be apparent that the invention applies to all integrated magnetic transducers which possess means coupled magnetically to magnetic circuits formed by the pole pieces for transformation of magnetic flux of loss from informations on support SM into an electric signal, means other than a winding. These means can be for example constituted by one of several magnetoresistances disposed between the pole pieces. A description of these transducers will be found for example in French Pat. No. 2,165,206 filed Dec. 22, 1971 by the Compagnie Internationale pour l'Informatique under the title: "Improved Magnetic Resistance and Electromagnetic Transducers Incorporating Them".

We claim:

1. An integrated magnetic transducer for reading magnetic information recorded on a magnetic support adapted to be driven before it comprising:
 a magnetic circuit formed of two pole pieces ($PPI_1$, $PPI_2$) separated by a gap (GI) parallel to the support (SM) and having a large dimension (Lpm) perpendicular to the direction of movement of the support;
 means (BOBI) coupled magnetically to this circuit, for transformation of magnetic flux of loss of information into an electric signal, the pole pieces ($PPI_1$, $PPI_2$) each comprising at the level of the gap (GI), a central part ($PCI_1$, $PPI_2$) bounded by two lateral parts ($PLI_1$ - $PLI_2$, $PLI_3$ - $PLI_4$) and spaced from such other such that the magnetic coupling between the central parts ($PCI_1$, $PCI_2$), at the level of the gap, is substantially less than the magnetic coupling between the corresponding lateral parts of the pole pieces ($PLI_1$-$PLI_3$, $PLI_2$-$PLI_4$).

2. An integrated magnetic transducer in accordance with claim 1 wherein at the level of the gap, the total width (Lpd) of the pole pieces is much greater than the large dimension (Lpm) of the gap (GI).

3. An integrated magnetic transducer in accordance with claims 1 or 2 wherein at the level of the gap (GI), the pole pieces are separated by a non-magnetic material of a variable thickness, the thickness of the non-magnetic material between the corresponding lateral parts of the polar pieces being less than the thickness between the central parts.

4. An integrated magnetic transducer in accordance with claims 1, or 2, wherein the thickness of the central parts of the pole pieces is greater than the thickness of the lateral parts.

5. An integrated magnetic transducer as set forth in claim 3 wherein the thickness of the central parts of the pole pieces is greater than the thickness of the lateral parts.

6. An integrated magnetic transducer in accordance with claim 3, wherein the non-magnetic material tapers to a very small thickness at the extremities of the lateral parts.

7. An integrated magnetic transducer for reading magnetic information recorded on a magnetic support adapted to be driven before the transducer, comprising:
 a magnetic circuit formed of two pole pieces, each pole piece having an end disposed in a plane parallel to the magnetic support, the pole pieces being spaced apart at said plane to form a gap therebetween, and each pole piece end having a central part bounded by two lateral parts, the spacing between the central parts of the pole pieces being greater than the spacing between the lateral parts so as to provide a magnetic coupling between the central parts that is substantially less than the magnetic coupling between corresponding lateral parts; and
 means coupled magnetically to the circuit for transforming magnetic flux produced therein by information on said magnetic support into an electrical signal.

8. An integrated magnetic transducer in accordance with claim 7, wherein the central parts have a dimension in said plane in a direction parallel to the gap that is small in relation to the total dimension in said plane and in said direction of the central and lateral parts.

9. An integrated magnetic transducer in accordance with claim 7, wherein the pole pieces are spaced apart by a layer of non-magnetic material that has a thickness between the central parts that is less than its thickness between the lateral parts, and wherein the non-magnetic material tapers to a very small thickness at the extremities of the lateral parts.

* * * * *